United States Patent
Branton et al.

(10) Patent No.: US 12,019,839 B2
(45) Date of Patent: *Jun. 25, 2024

(54) USER-SPECIFIC GRAPHICAL USER INTERFACE BASED ON A GRAPHICAL USER INTERFACE TEMPLATE

(71) Applicant: Capital One Services, LLC, McLean, VA (US)

(72) Inventors: Margaret Branton, Washington, DC (US); Mengda Qi, Chicago, IL (US); Joelle Panza, Chicago, IL (US); Andrew Turner, Chicago, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,366

(22) Filed: Jul. 10, 2023

(65) Prior Publication Data

US 2024/0004510 A1 Jan. 4, 2024

Related U.S. Application Data

(63) Continuation of application No. 17/810,009, filed on Jun. 30, 2022, now Pat. No. 11,720,220.

(51) Int. Cl.
*G06F 3/0481* (2022.01)
*G06F 9/451* (2018.01)

(52) U.S. Cl.
CPC ............ *G06F 3/0481* (2013.01); *G06F 9/451* (2018.02)

(58) Field of Classification Search
CPC .............................. G06F 3/0481; G06F 9/451
See application file for complete search history.

(56) References Cited

U.S. PATENT DOCUMENTS

2015/0193090 A1 7/2015 Grover et al.
2015/0295914 A1* 10/2015 Kelishadi .............. G06F 3/0482
 715/745
2016/0103927 A1 4/2016 Garris et al.
(Continued)

FOREIGN PATENT DOCUMENTS

EP 3414657 A1 12/2018

OTHER PUBLICATIONS

Co-pending U.S. Appl. No. 17/810,009, inventors Branton; Margaret et al., filed on Jun. 30, 2022.
(Continued)

*Primary Examiner* — Mong-Shune Chung
(74) *Attorney, Agent, or Firm* — Harrity & Harrity, LLP

(57) ABSTRACT

In some implementations, a system may obtain a graphical user interface (GUI) template that includes tiles corresponding to plug-ins. The system may generate, from the GUI template, category GUIs corresponding to categories and including a subset of the tiles. The system may identify account identifier(s) associated with a user identifier and one or more of the categories. The system may generate a user-specific GUI associated with a user account associated with the user identifier and including a subset of the category GUIs based on the account identifier(s). The plug-ins corresponding to the subset of the tiles may incorporate account data associated with at least one of the user account or the account identifier(s). The system may transmit, to a user device associated with the user account, the user-specific GUI.

20 Claims, 7 Drawing Sheets

(56) References Cited

U.S. PATENT DOCUMENTS

| | | | |
|---|---|---|---|
| 2018/0188934 A1* | 7/2018 | Andrizzi | G06Q 30/0601 |
| 2019/0102364 A1 | 4/2019 | Rochiramani et al. | |
| 2020/0042158 A1* | 2/2020 | Skarda | G06F 3/04883 |
| 2020/0134001 A1* | 4/2020 | Kantamsetty | G06F 16/2246 |
| 2021/0279082 A1* | 9/2021 | Wayne | G06F 9/451 |
| 2022/0374593 A1 | 11/2022 | Rasmussen et al. | |
| 2022/0398306 A1 | 12/2022 | Misra et al. | |

OTHER PUBLICATIONS

International Search Report and Written Opinion for Application No. PCT/US2023/018465, dated Aug. 7, 2023, 12 Pages.

\* cited by examiner

USER-SPECIFIC GRAPHICAL USER INTERFACE BASED ON A GRAPHICAL USER INTERFACE TEMPLATE

RELATED APPLICATION

This application is a continuation of U.S. patent application Ser. No. 17/810,009, filed Jun. 30, 2022, which is incorporated herein by reference in its entirety.

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user interface of the user device to cause the user device to perform an action. Additionally, the user interface may provide information to the user.

SUMMARY

Some implementations described herein relate to a system for providing data for a user-specific graphical user interface. The system may include one or more memories and one or more processors communicatively coupled to the one or more memories. The one or more processors may be configured to obtain, from a data structure, a graphical user interface template that includes a plurality of tiles corresponding to a plurality of plug-ins. The one or more processors may be configured to generate, from the graphical user interface template, a plurality of category graphical user interfaces corresponding to a plurality of categories. The one or more processors may be configured to identify, based on a user identifier associated with a user account of a user, one or more account identifiers associated with the user identifier. The one or more processors may be configured to generate a user-specific graphical user interface associated with the user account. The one or more processors may be configured to transmit, to a user device associated with the user account, the user-specific graphical user interface.

Some implementations described herein relate to a method for providing data for a user-specific graphical user interface. The method may include identifying, by a system having one or more processors and based on a user identifier associated with a user account of a user, one or more account identifiers associated with the user identifier, where the one or more account identifiers are associated with one or more categories of a plurality of categories. The method may include transmitting, by the system and to a user device associated with the user account, the user-specific graphical user interface, where the user-specific graphical user interface includes one or more category graphical user interfaces corresponding to the one or more categories, where the one or more category graphical user interfaces are based on a graphical user interface template that includes a plurality of tiles corresponding to a plurality of plug-ins, where the category graphical user interfaces include a subset of the plurality of tiles, and the subset of the plurality of tiles are based on the one or more categories, and where the plug-ins corresponding to the subset of the plurality of tiles incorporate account data associated with at least one of the user account or the one or more account identifiers. The method may include updating, by the system, the one or more category graphical user interfaces based on changes to the graphical user interface template. The method may include transmitting, by the system and to the user device, an updated user-specific graphical user interface, where the one or more category graphical user interfaces include the changes to the graphical user interface template.

Some implementations described herein relate to a non-transitory computer-readable medium that stores a set of instructions for a device. The set of instructions, when executed by one or more processors of the device, may cause the device to receive, from a user device, a user identifier associated with a user account. The set of instructions, when executed by one or more processors of the device, may cause the device to identify one or more account identifiers associated with the user identifier. The set of instructions, when executed by one or more processors of the device, may cause the device to identify one or more categories associated with the one or more account identifiers. The set of instructions, when executed by one or more processors of the device, may cause the device to generate a user-specific graphical user interface, wherein the user-specific graphical user interface includes one or more category graphical user interfaces corresponding to the one or more categories. The one or more category graphical user interfaces may be based on a graphical user interface template that includes a plurality of tiles corresponding to a plurality of plug-ins. The one or more category graphical user interfaces may include a subset of the plurality of tiles, and the subset of the plurality of tiles may be based on the one or more categories. The plug-ins corresponding to the subset of the plurality of tiles may incorporate account data associated with at least one of the user account or the one or more account identifiers.

DETAILED DESCRIPTION

Figure 1A:
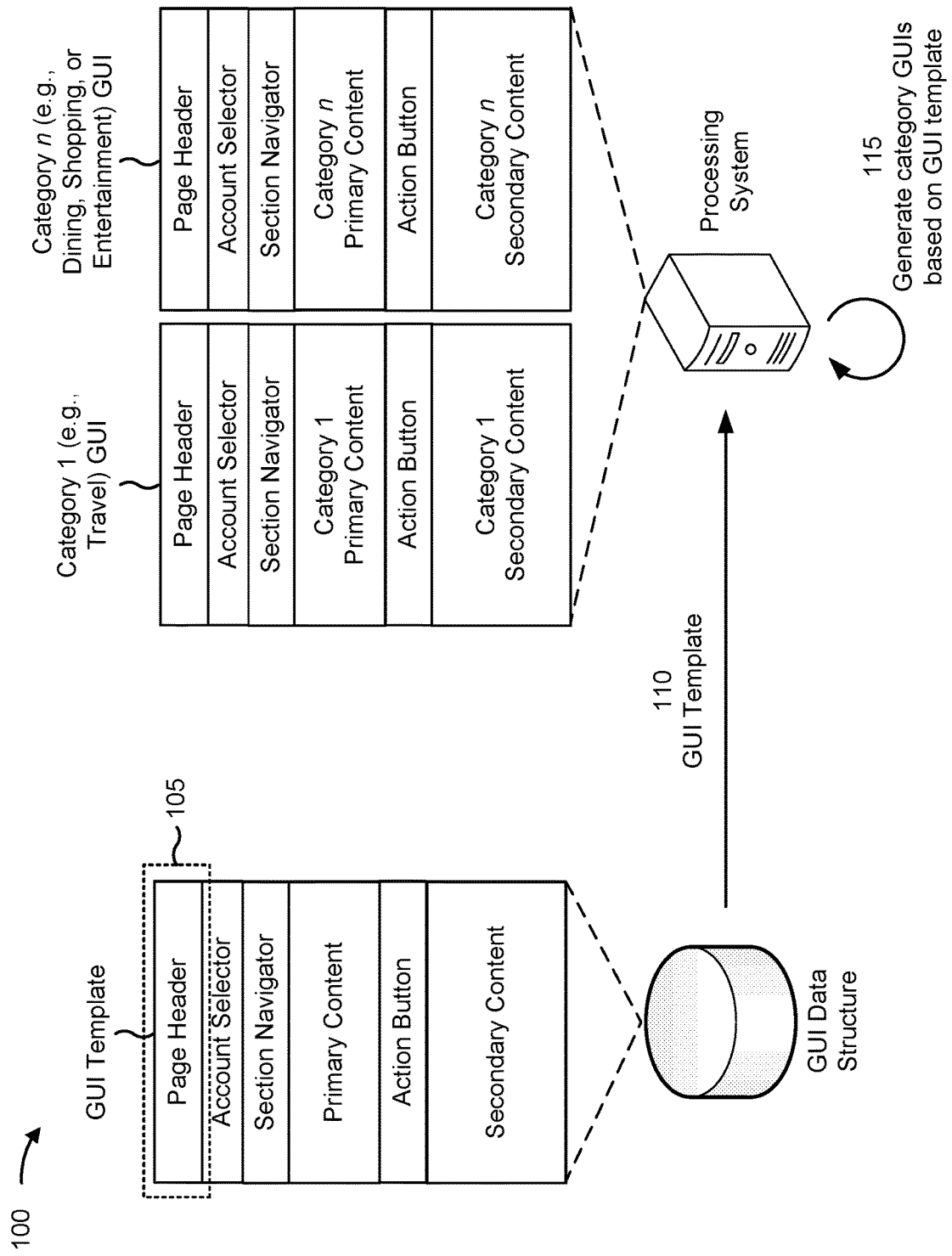
FIGS. 1A-1D are diagrams of an example implementation relating to a user-specific graphical user interface based on a graphical user interface template, in accordance with some embodiments of the present disclosure.

The following detailed description of example implementations refers to the accompanying drawings. The same reference numbers in different drawings may identify the same or similar elements.

Graphic user interfaces (GUIs), such as for mobile applications, often include multiple separate components or sub-GUIs. Each sub-GUI may have its own information and/or configuration. As a result, each sub-GUI may have to be individually created (e.g., have software code written for the particular sub-GUI), which may require significant computing resources. Additionally, updates to each sub-GUI are also separately made. Furthermore, the updates require a user to have to download an updated version of the application incorporating the GUIs. As a result, computing and network resources are inefficiently used. Accordingly, it is desirable to have a system that provides an efficient way to generate and/or update GUIs for an application and provide the GUIs to a user device to conserve computing and network resources.

In some implementations described herein, a system may utilize a GUI template to generate a user-specific GUI. The GUI template may include tiles corresponding to plug-ins. The system may generate, from the GUI template, category GUIs corresponding to categories and including a subset of the tiles. The system may identify account identifier(s) associated with a user identifier, associated with a user account of a user, and one or more of the categories. The system may generate a user-specific GUI associated with a user account associated with the user identifier and including a subset of the category GUIs based on the account identifier(s). The subset of the tiles may be based on the account identifier(s), and the plug-ins corresponding to the subset of the tiles may incorporate account data associated with at least one of the user account or the account identifier(s). The system may transmit, to a user device associated with the user account, the user-specific GUI.

By having the system use the GUI template to generate the category GUIs, and ultimately the user-specific GUI, and transmit the GUI template from the system to the user device, computing and network resources, which would otherwise have been used to individually and separately generate each category GUI, may be conserved. Additionally, each category GUI may be updated (e.g., re-arranging tiles) via an update to the GUI template, and therefore, the application (e.g., the software code of the application) that employs the user-specific GUI may not need to be updated. Accordingly, the system may update and provide the user-specific GUI to all users in an efficient manner that conserves computing and network resources. Furthermore, because the application itself is not being updated, the users may not need to update the application installed on the user devices to obtain the respective user-specific GUIs, thereby further conserving computing and network resources.

FIGS. 1A-1D are diagrams of an example 100 associated with a user-specific GUI based on a GUI template. As shown in FIGS. 1A-1D, example 100 includes a processing system, a data structure (also referred to as a GUI data structure), a user device, and a user profile database. These devices are described in more detail in connection with FIGS. 2 and 3.

As shown in FIGS. 1A-1D, a GUI template may be used to generate a GUI for an application installed on and/or accessed by a user device and via which a user may access account information associated with a user account of the user. The GUI (referred to as the user-specific GUI) may be specific to the user account and account information. The user account may include a user identifier (e.g., a name or username) by which the user account and/or user may be identifiable. Additionally, the user account may be associated with one or more sub-accounts via which the user may perform interactions with interaction parties (e.g., peers, merchants, and/or service providers). The sub-accounts may have corresponding unique account identifiers (e.g., an account ID number, a primary account number (PAN), or a virtual card number). Each account identifier may be associated with an account type (e.g., credit, savings, or checking). Additionally, based on the account type, each account identifier may be associated with one or more categories (e.g., travel, dining, shopping, and/or entertainment) by which interactions and/or benefits associated with the user account and/or account identifiers may be categorized. For example, a first account identifier (which may be associated with a particular type of credit account type) may be associated with a first set of categories (e.g., travel and dining), and a second account identifier (which may be associated with a different type of credit account type) may be associated with a second set of the categories (e.g., travel, dining, and shopping). The first set of categories and the second set of categories may overlap (e.g., may have common categories).

As shown in FIG. 1A, the GUI template may include multiple tiles 105. A tile may be a designated area of the GUI template in which information may be presented. The tiles 105 may have any shape, aspect ratio, and/or orientation. The tiles 105 may have the same or different shape, aspect ratio, and/or orientation as one or more other tiles 105. For example, as shown in FIG. 1A, the tiles 105 may have rectangular shapes with a same orientation (e.g., landscape), but one or more tiles 105 may have different aspect ratios. In some implementations, the tiles 105 may be arranged one after another in a vertical orientation. The tiles may be scrollable (e.g., in a vertical direction) to access tiles that do not fit within the screen of the user device. In some implementations, one or more tiles 105 may have sub-tiles or sub-parts, which each may separately correspond to a particular plug-in. For example, a content tile may include sub-parts of images and/or textual information. As another example, an action button tile may include multiple action buttons. The sub-parts may be rearrangeable within the particular tile.

In some implementations, the tiles 105 may correspond to different plug-ins each having a specific feature and/or function. For example, a first tile may correspond to a page header plug-in that presents page header information describing a feature of the user account and/or application (e.g., benefits or rewards). Additionally, or alternatively, a second tile may include an account selector plug-in via which the user may select a particular sub-account/account identifier for which corresponding sub-account information may be presented. Additionally, or alternatively, a third tile may include a section navigator plug-in via which the user may navigate between category information for the different categories associated with the particular sub-account/account identifier. Other tiles may include plug-ins for different content (e.g., primary content and secondary content) and/or for action buttons with which the user may interact (e.g., touch or press via a touchscreen of the user device) to perform an action associated with the particular sub-account/account identifier.

As shown by reference number 110, the processing system may retrieve or otherwise obtain the GUI template from the GUI data structure. As shown by reference number 115, the processing system may generate category GUIs corresponding to the different categories and based on the GUI template. Each category GUI may include, at least as a starting point, the number of tiles from the GUI template. In some implementations, each category GUI may be separately customizable (e.g., tiles from the GUI template may be removed and/or rearranged). The GUI template may include tiles applicable to all the categories, either individually or collectively. As a result, some of the tiles from the GUI template may not be applicable to some categories. Accordingly, the tile(s) may be removed for the category GUIs corresponding to those categories such that one or more of the category GUIs have a subset of the tiles. Because the category GUIs are generated from the template GUI, each category GUI does not need to be separately created from its own starting point (e.g., it may not need its own software code). Each category GUI may then have the tiles from the template GUI modified to include category information related to the particular category associated with the particular category GUI. Accordingly, computing time and resources to separately generate each GUI may be significantly conserved.

Figure 1B:
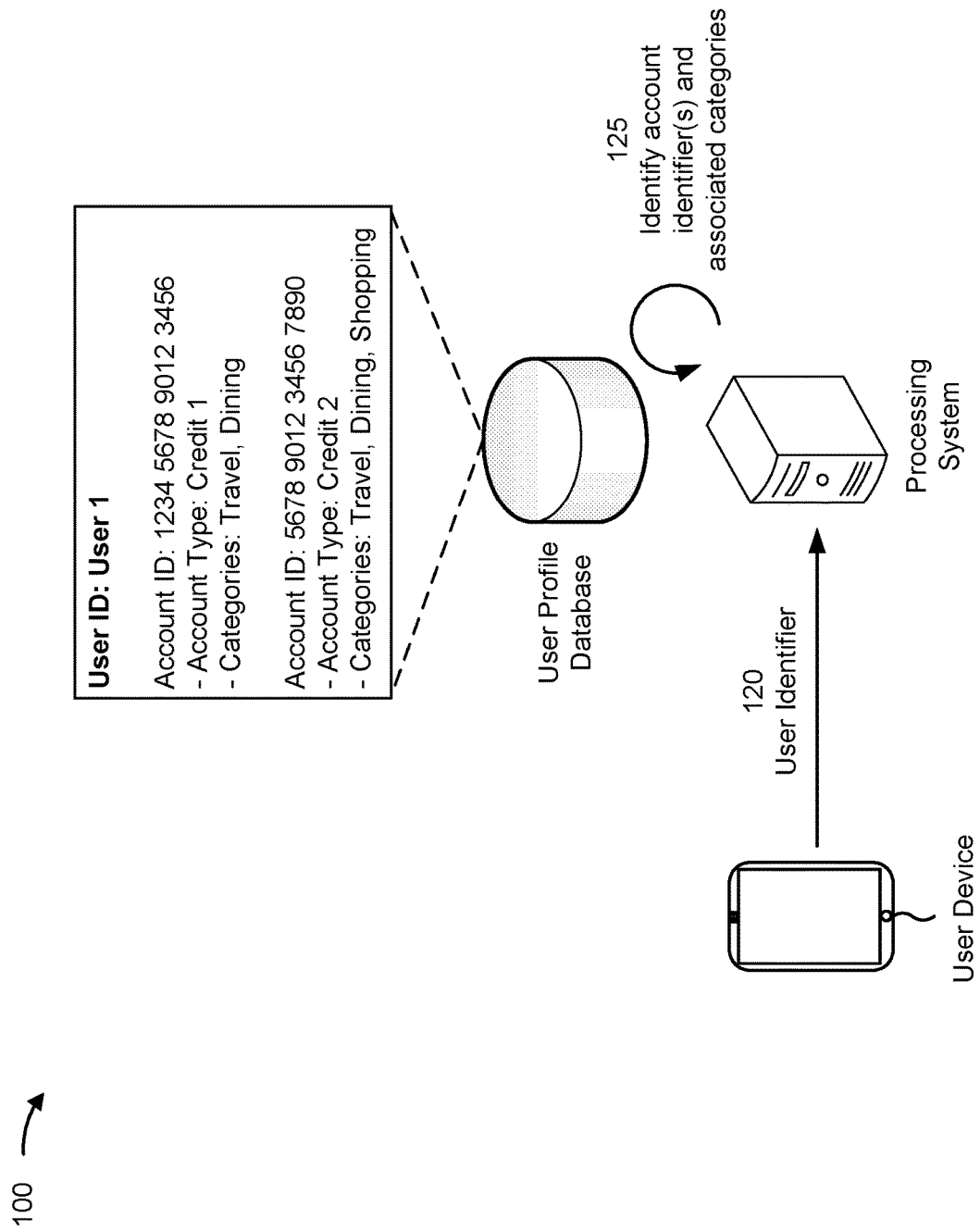

As shown in FIG. 1B, the user device (e.g., via input from the user) may access the user account via the application. As shown by reference number 120, as part of accessing the user account, the user device may transmit, and the processing system may receive, user identifier data indicating the user identifier associated with the user account. As shown by reference number 125, the processing system may identify one or more account identifiers based on the user identifier. The processing system also may identify the categories associated with each account identifier.

Figure 1C:
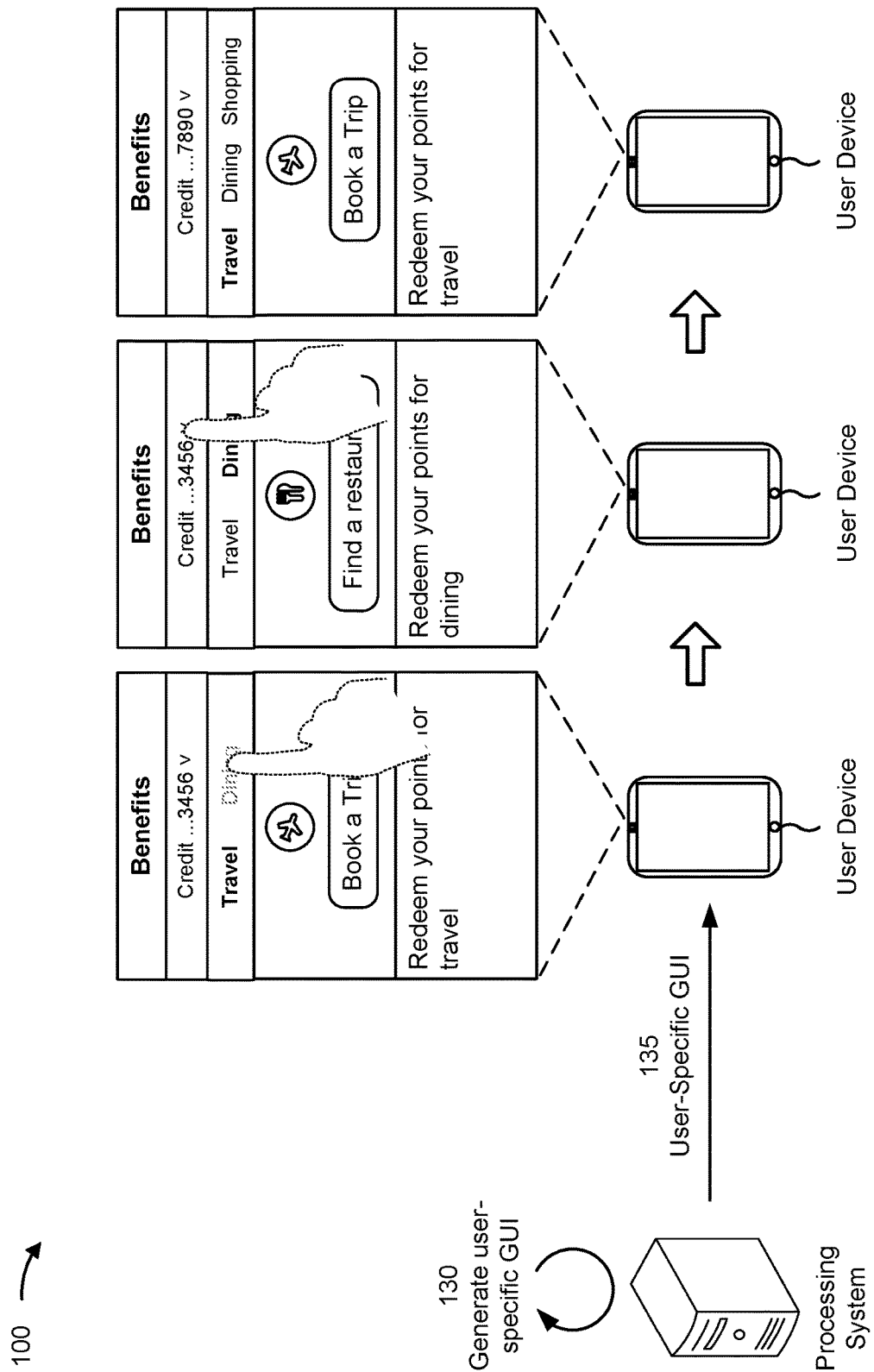

As shown in FIG. 1C, and by reference number 130, the processing system may generate the user-specific GUI associated with the user account. The user-specific GUI may include category GUIs corresponding to the categories associated with the one or more account identifiers and identified by the processing system. For example, for a user account having one account identifier (e.g., the first account identifier) associated with a first set of categories (e.g., travel and dining) and another account identifier (e.g., the second account identifier) associated with a second set of categories (e.g., travel, dining, and shopping), the user-specific GUI may include category GUIs corresponding to the categories across both account identifiers. The plug-ins corresponding to the tiles may incorporate account data associated with the user account and/or the particular account identifier(s). For example, the account data may include one or more account totals (e.g., account balance, rewards points, or travel points) associated with the account identifier(s). Additionally, or alternatively, the account data may include historical interaction data associated with one or more historical interactions of the user associated the account identifier(s). The historical interaction data for a particular interaction may include a date of the interaction, a geographic location of the interaction, and/or an interaction party identifier of the interaction party with which the interaction is performed.

As shown by reference number 135, the processing system may transmit, to the user device, GUI data indicating the user-specific GUI. As shown in FIG. 1C, the user device may display the user-specific GUI, including a particular category GUI. The user device, via interaction with the user device (e.g., via a touchscreen of the user device), may switch between the different category GUIs of the user-specific GUI. (e.g., via a plug-in of one of the tiles). Additionally, or alternatively, the user device, via another interaction with the user device, may switch between different sub-accounts/account identifiers (e.g., via a plug-in of another one of the tiles), resulting in a category GUI corresponding to the newly selected account identifier being displayed.

Figure 1D:
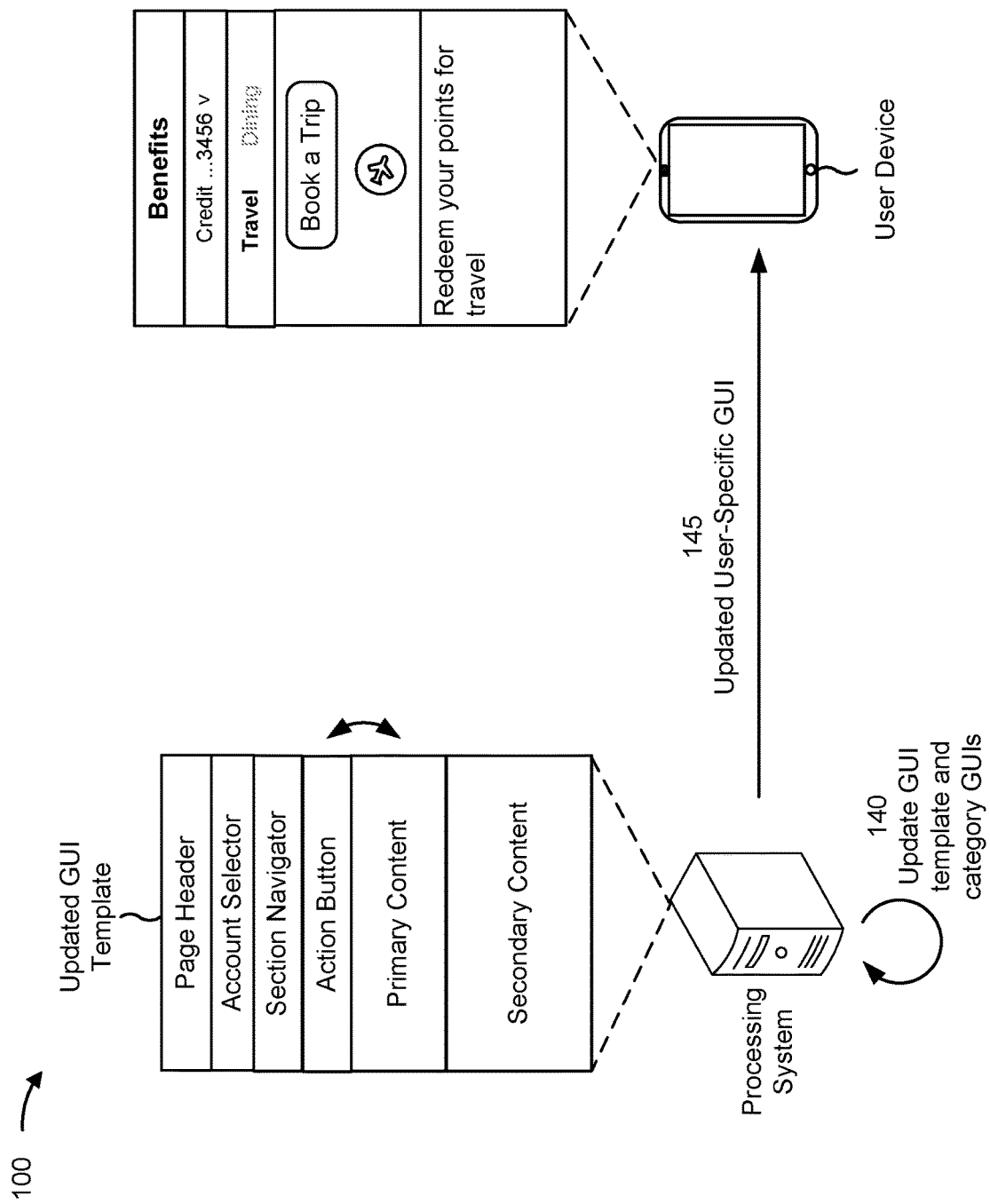

As shown in FIG. 1D, and by reference number 140, the processing system may update the GUI template to include one or more changes to one or more of the tiles. The processing system may store the updated GUI template (e.g., in the GUI data structure). For example, the update may include rearranging the order of the tiles (e.g., in the vertical orientation), rearranging the configuration (e.g., from a vertical orientation to a matrix configuration or a horizontal configuration), and/or adding or removing tiles. As another example, in implementations in which one or more tiles have sub-parts, as described above, the update may include rearranging the sub-parts in a particular order.

The processing system then may update the category GUIs based on the update to the template GUI (e.g., the updated category GUIs may have updated configurations of the tiles and/or sub-parts of the tiles), which in turn updates the user-specific GUI. For example, a change in the vertical orientation of the tiles in the updated GUI template may results in a corresponding change to a vertical orientation in the tiles in the category GUIs. As another example, a rearrangement of sub-parts, of a particular tile, in a particular order results in the sub-parts of a corresponding tile in the category GUIs being rearranged in the same particular order. As shown by reference number 145, the processing system may transmit the updated user-specific GUI to the user device.

As explained above, the processing system is able to generate, from a GUI template, a user-specific GUI (e.g., for an application installed on a user device). The user-specific GUI includes category GUIs, based on the GUI template, corresponding to the categories associated with one or more account identifiers of a user account. The processing system may update the user-specific GUI whenever a change has been made to the GUI template, and automatically transmit the updated user-specific GUI to the user device. Accordingly, whenever the user opens the application, the user-specific GUI will be updated without the user having to download an updated version of the application. As a result, computing and network resources of the system and of the user device may be conserved.

As indicated above, FIGS. 1A-1D are provided as an example. Other examples may differ from what is described with regard to FIGS. 1A-1D.

Figure 2:
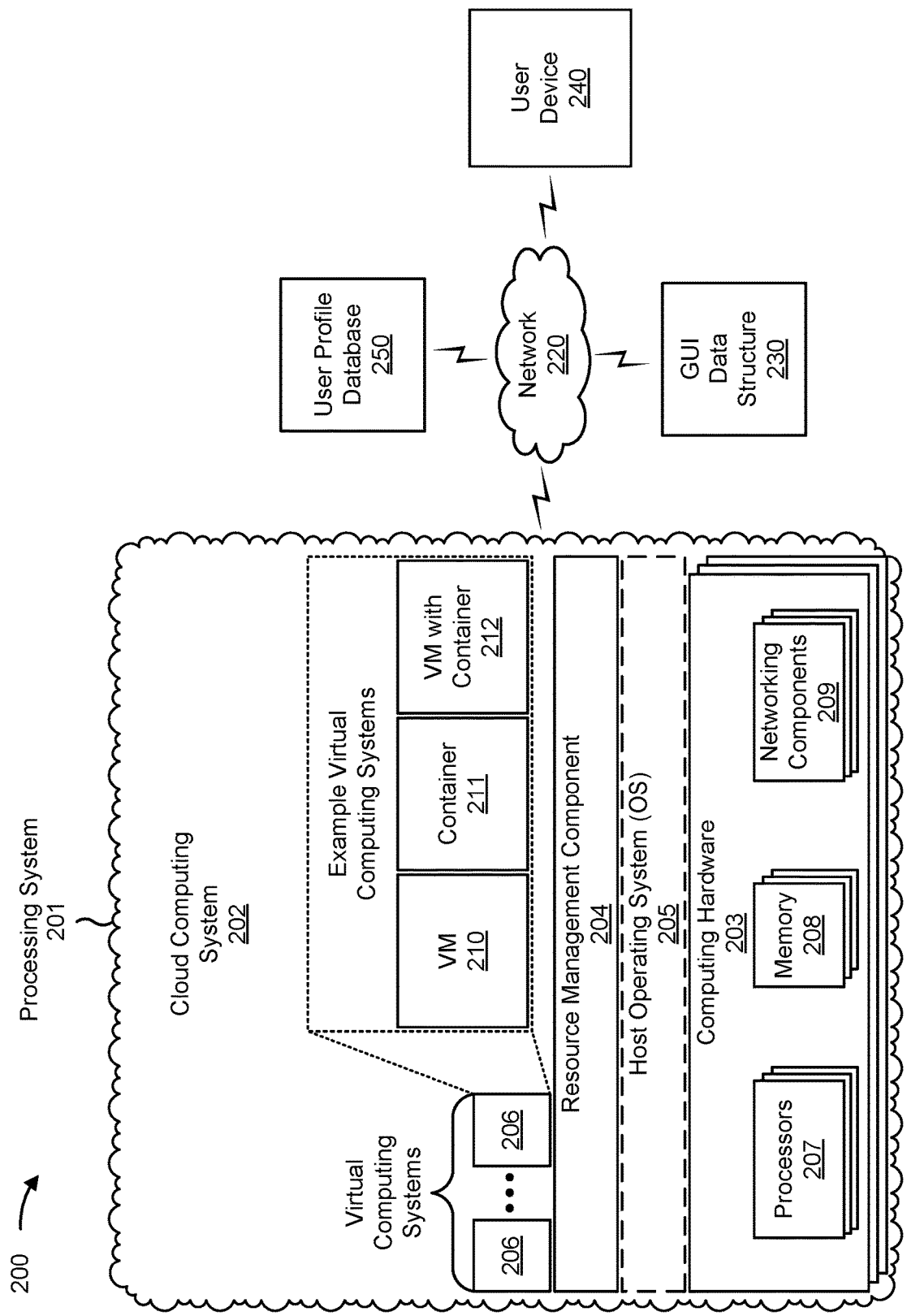
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a processing system 201, which may include one or more elements of and/or may execute within a cloud computing system 202. The cloud computing system 202 may include one or more elements 203-212, as described in more detail below. As further shown in FIG. 2, environment 200 may include a network 220, a GUI data structure 230, a user device 240, and/or a user profile database 250. Devices and/or elements of environment 200 may interconnect via wired connections and/or wireless connections.

The processing system 201 may include one or more devices capable of receiving, generating, storing, processing, providing, and/or routing information associated with a user-specific GUI based on a GUI template, as described elsewhere herein. The processing system 201 may include a communication device and/or a computing device. For example, the processing system 201 may include a server, such as an application server, a client server, a web server, a database server, a host server, a proxy server, a virtual server (e.g., executing on computing hardware), or a server in a cloud computing system. In some implementations, the processing system 201 includes computing hardware used in a cloud computing environment.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the processing system 201 may include one or more elements 203-212 of the cloud computing system 202, may execute within the cloud computing system 202, and/or may be hosted within the cloud computing system 202, in some implementations, the processing system 201 may not be cloud-based (e.g., may be implemented outside of a cloud computing system) or may be partially cloud-based. For example, the processing system 201 may include one or more devices that are not part of the cloud computing system 202, such as device 300 of FIG. 3, which may include a standalone server or another type of computing device. The processing system 201 may perform one or more operations and/or processes described in more detail elsewhere herein.

Network 220 may include one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The GUI data structure 230 may include one or more devices capable of receiving, generating, storing, processing, and/or providing information associated with a user-specific GUI based on a GUI template, as described elsewhere herein. The GUI data structure 230 may include a communication device and/or a computing device. For example, the GUI data structure 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the GUI data structure 230 may store template data indicating a GUI template, as described elsewhere herein. In some implementations, the GUI data structure 230 may have a linear data structure (e.g., an array data structure, a stack data structure, a queue data structure, or a linked list data structure) or a non-linear data structure (e.g., a graph data structure or a trees data structure).

The user device 240 may include one or more devices capable of receiving, generating, storing, processing, and/or providing information associated with a user-specific GUI based on a GUI template, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The user profile database 250 may include one or more devices capable of receiving, generating, storing, processing, and/or providing information associated with a user-specific GUI based on a GUI template, as described elsewhere herein. The user profile database 250 may include a communication device and/or a computing device. For example, the user profile database 250 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user profile database 250 may store account information associated with a user account and/or a user (e.g., a user identifier, one or more account identifiers, and/or interaction data associated with historical interactions associated with the user account and/or the user), as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
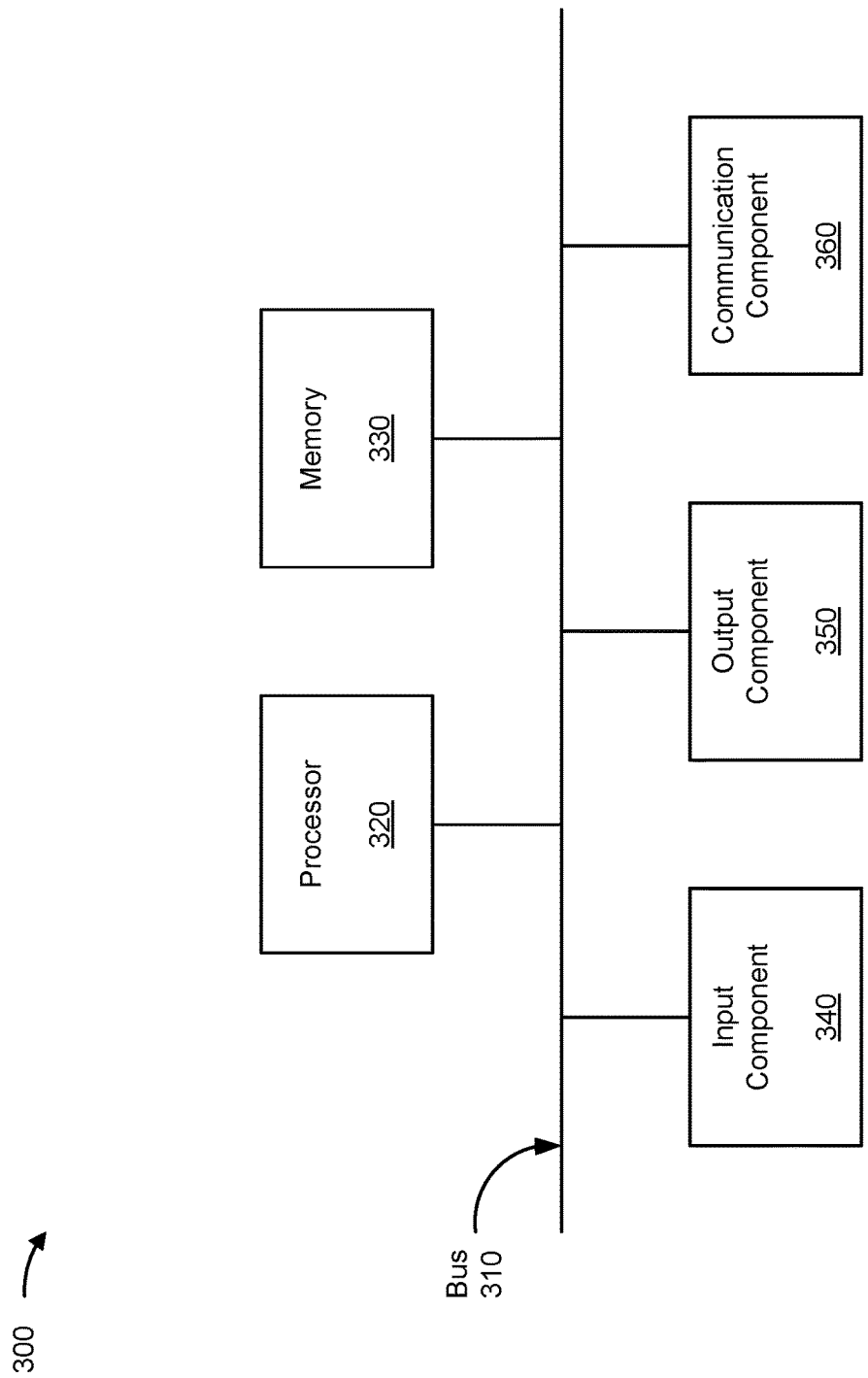
FIG. 3 is a diagram of example components of a device associated with a user-specific graphical user interface based on a graphical user interface template, in accordance with some embodiments of the present disclosure.

FIG. 3 is a diagram of example components of a device 300 associated with user-specific graphical user interface based on a graphical user interface template. Device 300 may correspond to the GUI data structure 230, the user device 240, and/or the user profile database 250. In some implementations, the GUI data structure 230, the user device 240, and/or the user profile database 250 include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 may enable device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
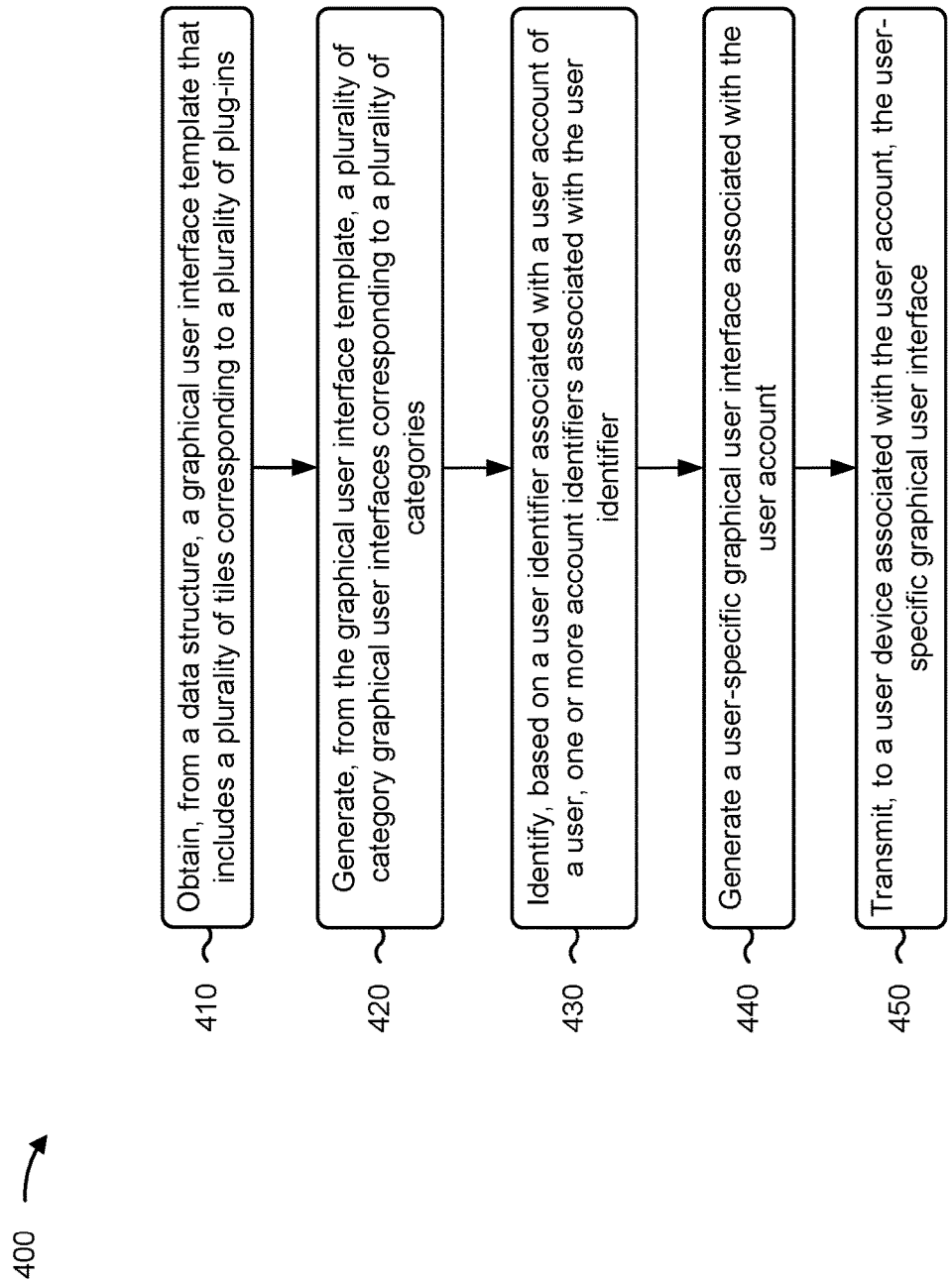
FIG. 4 is a flowchart of an example process associated with a user-specific graphical user interface based on a graphical user interface template, in accordance with some embodiments of the present disclosure.

FIG. 4 is a flowchart of an example process 400 associated with a user-specific graphical user interface based on a graphical user interface template. In some implementations, one or more process blocks of FIG. 4 may be performed by the processing system 201. In some implementations, one or more process blocks of FIG. 4 may be performed by one or more components of the device 300, such as processor 320, memory 330, input component 340, output component 350, and/or communication component 360.

As shown in FIG. 4, process 400 may include obtaining, from a data structure, a GUI template that includes a plurality of tiles corresponding to a plurality of plug-ins (block 410). For example, the processing system 201 (e.g., using processor 320 and/or memory 330) may obtain, from a data structure, a GUI template that includes a plurality of tiles corresponding to a plurality of plug-ins, as described above in connection with reference number 110 of FIG. 1A. As an example, the processing system may retrieve or otherwise obtain the GUI template from the GUI data structure.

As further shown in FIG. 4, process 400 may include generating, from the GUI template, a plurality of category GUIs corresponding to a plurality of categories (block 420). For example, the processing system 201 (e.g., using processor 320 and/or memory 330) may generate, from the GUI template, a plurality of category GUIs corresponding to a plurality of categories, as described above in connection with reference number 115 of FIG. 1A. As an example, the processing system 201 may generate category GUIs based on the GUI template. In some implementations, the plurality of category GUIs may include a subset of the plurality of tiles.

As further shown in FIG. 4, process 400 may include identifying, based on a user identifier associated with a user account of a user, one or more account identifiers associated with the user identifier (block 430). The one or more account identifiers may be associated with one or more of the plurality of categories. For example, the processing system 201 (e.g., using processor 320 and/or memory 330) may identify, based on a user identifier associated with a user account of a user, one or more account identifiers associated with the user identifier, as described above in connection with reference number 125 of FIG. 1B. As an example, the processing system 201 may identify one or more account identifiers based on the user identifier.

As further shown in FIG. 4, process 400 may include generating a user-specific GUI associated with the user account (block 440). For example, the processing system 201 (e.g., using processor 320 and/or memory 330) may generate a user-specific graphical user interface associated with the user account, as described above in connection with reference number 130 of FIG. 1C. As an example, the processing system 201 may generate a user-specific GUI associated with the user account.

In some implementations, the user-specific GUI may include a subset of the plurality of category GUIs. In some implementations, the subset of the plurality of category GUIs may be based on the one or more account identifiers. In some implementations, the plug-ins corresponding to the subset of the plurality of tiles may incorporate account data associated with at least one of the user account or the one or more account identifiers.

As further shown in FIG. 4, process 400 may include transmitting, to a user device associated with the user account, the user-specific GUI (block 450). For example, the processing system 201 (e.g., using processor 320, memory 330, and/or communication component 360) may transmit, to a user device associated with the user account, the user-specific GUI, as described above in connection with reference number 135 of FIG. 1C. As an example, the processing system 201 may transmit, to the user device, GUI data indicating the user-specific GUI.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing data for a user-specific graphical user interface, the system comprising:
   one or more memories; and
   one or more processors, coupled to the one or more memories, configured to:
      generate, based at least in part a graphical user interface template, a plurality of category graphical user interfaces corresponding to a plurality of categories;
      identify one or more account identifiers associated with a user account, wherein the one or more account identifiers are associated with one or more categories of the plurality of categories;
      generate a user-specific graphical user interface associated with the user account, the user-specific graphical user interface including a subset of the plurality of category graphical user interfaces that is based at least in part on the one or more account identifiers; and
      transmit, to a user device associated with the user account, the user-specific graphical user interface.

2. The system of claim 1, wherein the plurality of category graphical user interfaces include a set of tiles, and wherein the one or more processors are further configured to:
   update the graphical user interface template to include one or more updates,
      wherein the set of tiles include the one or more updates.

3. The system of claim 2, wherein the graphical user interface template includes a plurality of tiles corresponding to the set of tiles, wherein the plurality of tiles include the set of tiles, wherein one or more tiles, of the plurality of tiles of the graphical user interface template, includes a first set of sub-parts rearrangeable within the one or more tiles, and wherein rearranging the first set of sub-parts causes a rearranging of a second set of sub-parts of one or more corresponding tiles of the set of tiles of the plurality of category graphical user interfaces.

4. The system of claim 3, wherein the plurality of tiles, of the graphical user interface template, are arranged in a particular orientation, and
wherein a change to the particular orientation results in a corresponding change associated with the set of tiles of the plurality of category graphical user interfaces.

5. The system of claim 1, wherein generating the user-specific graphical user interface includes incorporating account data via a set of plug-ins corresponding to the graphical user interface template, and wherein the account data includes one or more account totals associated with the one or more account identifiers.

6. The system of claim 5, wherein a navigator plug-in, of the set of plug-ins, enables switching between the subset of the plurality of category graphical user interfaces of the user-specific graphical user interface.

7. The system of claim 5, wherein the account data includes historical interaction data associated with one or more historical interactions of a user associated with the one or more account identifiers.

8. The system of claim 7, wherein the historical interaction data for an interaction, of the one or more historical interactions, includes at least one of:
a date of the interaction,
a geographic location of the interaction, or
an interaction party identifier of an interaction party with which the interaction is performed.

9. A method for providing data for a user-specific graphical user interface, comprising:
generating, based at least in part a graphical user interface template, a plurality of category graphical user interfaces corresponding to a plurality of categories;
identifying one or more account identifiers associated with a user account, wherein the one or more account identifiers are associated with one or more categories of the plurality of categories;
generating a user-specific graphical user interface associated with the user account, the user-specific graphical user interface including a subset of the plurality of category graphical user interfaces that is based at least in part on the one or more account identifiers; and
transmitting, to a user device, the user-specific graphical user interface.

10. The method of claim 9, wherein the plurality of category graphical user interfaces include a set of tiles, and wherein the method further comprises:
updating the graphical user interface template to include one or more updates,
wherein the set of tiles include the one or more updates.

11. The method of claim 10, wherein the graphical user interface template includes a plurality of tiles corresponding to the set of tiles, wherein the plurality of tiles include the set of tiles, wherein one or more tiles, of the plurality of tiles of the graphical user interface template, includes a first set of sub-parts rearrangeable within the one or more tiles, and
wherein rearranging the first set of sub-parts causes a rearranging of a second set of sub-parts of one or more corresponding tiles of the set of tiles of the plurality of category graphical user interfaces.

12. The method of claim 11, wherein the plurality of tiles, of the graphical user interface template, are arranged in a particular orientation, and
wherein a change to the particular orientation results in a corresponding change associated with the set of tiles of the plurality of category graphical user interfaces.

13. The method of claim 9, wherein generating the user-specific graphical user interface includes incorporating account data via a set of plug-ins corresponding to the graphical user interface template, and wherein the account data includes one or more account totals associated with the one or more account identifiers.

14. The method of claim 13, wherein a navigator plug-in, of the set of plug-ins, enables switching between the subset of the plurality of category graphical user interfaces of the user-specific graphical user interface.

15. The method of claim 13, wherein the account data includes historical interaction data associated with one or more historical interactions of a user associated with the one or more account identifiers.

16. A non-transitory computer-readable medium storing a set of instructions, the set of instructions comprising:
one or more instructions that, when executed by one or more processors of a device, cause the device to:
generate, based at least in part a graphical user interface template, a plurality of category graphical user interfaces corresponding to a plurality of categories;
identify one or more account identifiers associated with a user account, wherein the one or more account identifiers are associated with one or more categories of the plurality of categories;
generate a graphical user interface associated with the user account, the graphical user interface including a subset of the plurality of category graphical user interfaces that is based at least in part on the one or more account identifiers; and
transmit, to a user device associated with the user account, the graphical user interface.

17. The non-transitory computer-readable medium of claim 16, wherein the plurality of category graphical user interfaces include a set of tiles, and wherein the one or more processors are further configured to:
update the graphical user interface template to include one or more updates,
wherein the set of tiles include the one or more updates.

18. The non-transitory computer-readable medium of claim 17, wherein the graphical user interface template includes a plurality of tiles corresponding to the set of tiles, wherein the plurality of tiles include the set of tiles, wherein one or more tiles, of the plurality of tiles of the graphical user interface template, includes a first set of sub-parts rearrangeable within the one or more tiles, and
wherein rearranging the first set of sub-parts causes a rearranging of a second set of sub-parts of one or more corresponding tiles of the set of tiles of the plurality of category graphical user interfaces.

19. The non-transitory computer-readable medium of claim 18, wherein the plurality of tiles, of the graphical user interface template, are arranged in a particular orientation, and
wherein a change to the particular orientation results in a corresponding change associated with the set of tiles of the plurality of category graphical user interfaces.

20. The non-transitory computer-readable medium of claim 16, wherein the plurality of categories includes one or more of dining, travel, entertainment, or shopping.

* * * * *